United States Patent [19]

Chumley

[11] 4,376,447
[45] Mar. 15, 1983

[54] HOT WATER VALVE

[75] Inventor: Calvin L. Chumley, St. Louis, Mo.

[73] Assignee: UMC Industries, Inc., Stamford, Conn.

[21] Appl. No.: 226,190

[22] Filed: Jan. 19, 1981

Related U.S. Application Data

[63] Continuation-in-part of Ser. No. 67,816, Aug. 20, 1979, abandoned.

[51] Int. Cl.³ .................. F16K 31/06; F16K 1/38; F16K 1/42; F16K 25/00
[52] U.S. Cl. .................. 137/244; 137/312; 137/559; 251/141; 251/333
[58] Field of Search ............ 251/129, 141, 137, 333, 251/362, 365; 137/312, 559, 240, 244

[56] References Cited

U.S. PATENT DOCUMENTS

| | | | |
|---|---|---|---|
| 2,127,892 | 8/1938 | Stewart | 251/331 X |
| 2,619,116 | 11/1952 | Ralston | 251/137 X |
| 2,888,237 | 5/1959 | Dahl | 251/141 X |
| 3,231,790 | 1/1966 | van der Kaay et al. | 251/130 X |
| 3,298,319 | 1/1967 | Savage | 137/242 X |
| 3,512,749 | 5/1970 | Hoakes et al. | 251/141 X |
| 3,727,629 | 4/1973 | Gifford . | |
| 3,743,240 | 7/1973 | Merriner et al. | 251/141 X |
| 3,773,064 | 11/1973 | Focht . | |
| 4,132,194 | 1/1979 | Saito | 251/331 X |

Primary Examiner—Arnold Rosenthal
Attorney, Agent, or Firm—Senniger, Powers, Leavitt and Roedel

[57] ABSTRACT

A valve comprising a body having a chamber therein, fluid inlet and outlet ports in communication with the chamber, an opening for a valve plunger, and a nipple extending into the chamber having a passage constituting one of said ports. A valve plunger extends through the opening in the body and is movable toward and away from the nipple, the plunger comprising a generally conical valve member at its end toward the nipple in axial alignment with the passage in the nipple. A sleeve of resilient material of generally circular section is secured to the nipple and has a portion extending beyond the end of the nipple. The inner surface of the extending portion of the sleeve at the free end thereof is countersunk thereby forming a frustoconical valve seat. The angle of the seat relative to the axis of the sleeve is at least as great as the angle of the conical valve member relative to the axis of the sleeve, and the valve member, on entry into the sleeve, thereby engages the inner end of the seat and, on continued movement in the direction toward the nipple, expands the extending portion of the sleeve and sealingly engages the seat, the valve member, in moving into the sleeve, wiping the seat to remove scale which may have deposited on the seat and on the portion of the valve member engageable with the seat.

18 Claims, 4 Drawing Figures

HOT WATER VALVE

This application is a continuation-in-part of my co-pending U.S. patent application Ser. No. 67,816, filed Aug. 20, 1979, and now abandoned.

BACKGROUND OF THE INVENTION

This invention relates to valves, and more particularly to a self-cleaning hot water solenoid valve such as is used in a hot beverage vendor to control the flow of hot water from the hot water tank of the vendor for a hot beverage (e.g., coffee).

Prior solenoid valves such as used in hot beverage vendors for controlling the flow of hot water from the hot water tank of the vendor are prone to leakage past the valve seat after a relatively short interval of use in the field. It appears that such leakage is due primarily to the accumulation of scale (e.g., calcium sulfate, calcium carbonate, magnesium carbonate, iron carbonate) on the valve seat and the movable valve member, the incrustation of scale preventing the movable valve member from completely sealing against the seat and thereby resulting in water seeping past the seat. The incrustation is increased and hastened by the fact that the water is very hot (e.g., 205°-210° F.) and is especially acute, of course, where the water has a relatively high concentration of dissolved minerals that tend to precipitate when the water is heated to such temperatures.

SUMMARY OF THE INVENTION

Among the several objects of the invention may be noted the provision of a self-cleaning valve, especially for hot water, in which accumulations of scale on the valve seat and the movable valve member are scraped off during operation of the valve; the provision of such a valve having a prolonged leakproof characteristic for use in hot beverage vendors to control dispensing of hot water from the tank of the vendor where the water temperature may reach 205°-210°; the provision of such a valve wherein the prolonged leakproof characteristic is obtained in simple, efficient and relatively economical manner; the provision of such a valve which has a tube of resilient material, a countersunk end portion of which acts as the valve seat; the provision of such a valve which has a valve body of the "dry-type" in which fluid communication between the valve chamber and the solenoid is blocked; the provision of such a valve which holds fluid which may leak from the valve body into the solenoid while enabling the solenoid plunger to move freely within the solenoid; and the provision of such a valve which provides a visually detectable indication of fluid leakage into the solenoid and thus an indication that the valve is defective and should be repaired or replaced.

In general, a valve of this invention comprises a body having a chamber therein, a fluid inlet port and a fluid outlet port in communication with the chamber, an opening for a valve plunger, and a nipple extending into the chamber and having a passage therethrough constituting one of said ports. A valve plunger extends through the opening in the body movable toward and away from an end of the nipple, the plunger having a valve member at its end toward the nipple in axial alignment with the passage in the nipple. A sleeve of resilient material is secured on the nipple in stretched surrounding relation with respect to the nipple, the sleeve being of generally circular section and having a portion extending beyond the end of the nipple, the inner surface of the extending portion of the sleeve at the free end thereof being countersunk thereby forming a frustoconical valve seat. The valve member has a sloping surface portion engageable with said frustoconical valve seat for blocking fluid flow through said one port. The angle of said frustoconical seat relative to the axis of the sleeve is at least as great as the angle of said sloping surface portion relative to the axis of the sleeve, whereby said sloping surface portion, on entry into the sleeve, engages said frustoconical seat inwardly from the outer end of the sleeve and, on continued movement in the direction toward the nipple, expands the extending portion of the sleeve and sealingly engages the frustoconical seat, said valve member, in moving into the sleeve, wiping the frustoconical seat to remove scale which may have deposited on the seat and on the portion of the valve member engageable with the seat.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
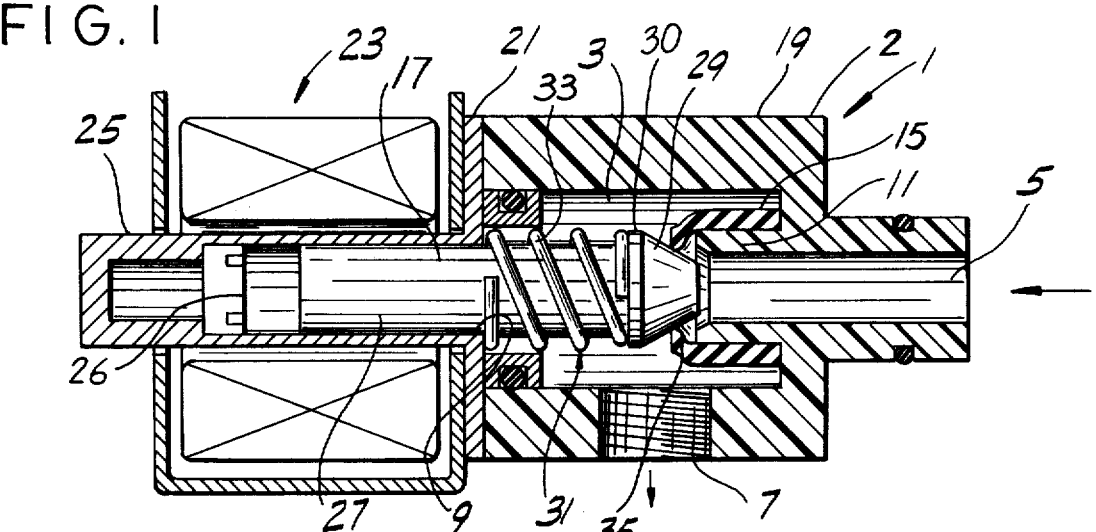
FIG. 1 is a section of a valve of this invention showing a sleeve of resilient material stretched over a nipple of the valve and a movable valve member seated in the sleeve.
Figure 2:
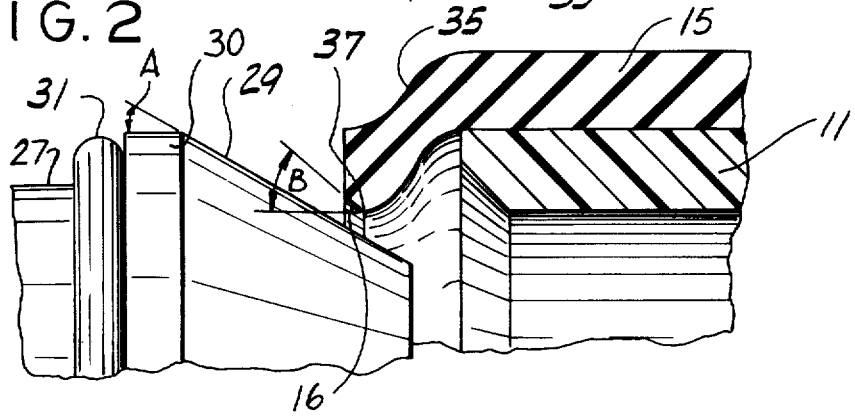
FIG. 2 is an enlarged fragmentary section showing the movable valve member and the sleeve with the valve member spaced from the sleeve.

Referring to FIGS. 1 and 2 of the drawings, a valve of this invention, generally indicated at 1, is shown to comprise a valve body 2 having a chamber 3 therein, a fluid inlet port 5 and a fluid outlet port 7 in communication with the chamber, an opening 9 at one end of the valve body, and a nipple 11 at the other end of the valve body extending into the chamber having a passage therethrough constituting the stated inlet port 5. A sleeve 15 of resilient material having a valve seat 16 at the inner end thereof is secured to the nipple in stretched surrounding relation with respect to the nipple. A valve plunger 17 extends through the opening 9 into the valve chamber 3 and is movable toward the sleeve to a position in which it sealingly engages the valve seat 16 to close the inlet port 5 and away from the sleeve to open the inlet port.

More particularly, the valve body comprises a cuplike structure 19 made of suitable material such as polyvinylidene fluoride such as that sold under the trade name KYNAR by Pennwalt Corporation of Philadelphia, Pennsylvania, and an end wall 21 of suitable material such as brass sealingly secured to the cup-like structure 19 covering the mouth thereof. A solenoid 23 is carried on a tubular projection 25 of the end wall constituting a plunger guide, the plunger guide being closed at its outer end 26, having an open inner end constituting the opening 9, and extending in axial alignment with the nipple 11 and sleeve 15.

The valve plunger 17 comprises a generally cylindrical rod 27 having a sliding fit in the plunger guide 25 and a generally frustoconical valve member 29 secured to the rod at its inner end, the plunger rod and the valve member being in axial alignment with the nipple and sleeve 15. The valve member 29 has a generally cylindrical portion 30 at its outer end of a larger diameter than the rod 27 thereby forming a shoulder. The frustoconical surface of the valve member 29 toward the sleeve 15 extends at an angle A relative to the axis of the sleeve in the range of approximately 30° to 45°. Preferably the angle A is approximately 30°.

Means 31, such as a coiled spring 33 carried on the rod 27 and engageable with the shoulder of the plunger 17, biases the plunger toward the sleeve 15 and into engagement with the valve seat 16 for closing the fluid inlet port 5. The solenoid 23, on being energized, moves the plunger away from the sleeve 15 and out of engagement with the valve seat 16 to open the inlet port 5. As shown in FIG. 1, the valve body 2 is of the "wet-type" in which the plunger rod 27, the spring 33 and the plunger guide 25 are exposed to the fluid in the valve chamber 3.

The sleeve 15 is a generally cylindrical tube of suitable material such as silicone rubber. It has an undeformed inside diameter somewhat greater than the diameter of the circular inner end of the conical valve member 29 to enable entry of the inner end of the valve member therein, but somewhat less than the outside diameter of the nipple 11 so that it can be sealingly secured to the nipple by stretching it over the nipple (e.g., the sleeve has an undeformed inside diameter of $\frac{3}{8}$" while the nipple has an outside diameter of $\frac{1}{2}$"). Means such as a metal ring (not shown) having inwardly directed teeth engageable with the nipple may be provided on the sleeve to assist in securing the sleeve to the outside of the nipple. The sleeve 15 is of greater length than the nipple and thus, when secured to the nipple, has a portion 35 extending beyond the free end of the nipple which necks down at its inner or free end to an inner diameter substantially equal to the inner diameter of the tube, when in undeformed condition. As shown in FIG. 2, the interior surface of the sleeve at its inner end is countersunk to form the stated valve seat 16, the valve seat extending a relatively short distance (i.e., approximately 0.035 inch) into the sleeve at an angle B relative to the axis of the sleeve in the range of approximately 30° to 45°, as measured when the sleeve is secured to the nipple 11. Preferably, the angle B is approximately 45°. Due to the deformation of the extending portion 35 of the sleeve which accompanies the stretching of the sleeve to secure it to the nipple, the range of the angle of the valve seat is slightly greater than the above-stated range when the angle is measured with the sleeve in undeformed condition.

In accordance with this invention, the angle B of the valve seat 16 is at least as great as the angle A of the valve member 29, so that upon entry of the valve member into the sleeve 15 under the bias of the spring 33, the valve member engages the inner end 37 of the valve seat and, upon its continued movement in the direction toward the nipple, expands the extending portion 35 of the sleeve and sealingly engages the valve seat. The countersinking of the sleeve 15 to form the valve seat 16 facilitates the entry of the valve member 29 into the sleeve and eliminates the sharp edge at the inner end of the interior surface of the sleeve 15 (i.e., the valve seat end) which would otherwise be present and which would be subject to rolling over upon being engaged by the valve member. (Rolling over a portion of the inner end of the interior surface of the sleeve while the remainder thereof is not rolled over would prevent sealing engagement of the valve member with the sleeve.) As the valve member 27 moves into the sleeve 15, it wipes the seat 16 to remove scale which may have deposited on the valve seat and on the portion of the valve member engageable with the seat to provide a leakproof closure of the inlet port 5. The bias force of the spring 33 and the length and the deformability of the portion 35 of the sleeve are such that, at its point of deepest penetration into the sleeve, the valve member 29 is spaced from the nipple. If such engagement of the valve member 29 with the nipple 11 were to occur, it could prevent proper seating of the valve member. Withdrawal of the valve member from the sleeve upon energization of the solenoid 23 also results in wiping of the seat 16 by the valve member 29.

The valve of this invention has been found to be particularly useful in hot beverage vendors, i.e., machines for vending coffee, hot chocolate, etc., on location in areas where the water supplied to the vendors contains relatively high amounts of dissolved minerals (e.g., calcium carbonate, magnesium carbonate) that tend to precipitate out when the water is heated (e.g., to 205°–210° F. for making coffee). Such vendors conventionally have a hot water tank and a solenoid-operated hot water valve which is opened on a vend cycle to deliver a quantity of hot water from the tank to brew a cup of coffee, or to mix other hot drinks (e.g., chocolate, or soup). In areas such as above noted, the valve members and seats of prior valves become incrusted relatively rapidly with precipitated minerals, to the extent that the closure members of the valves are unable to seal on the seats and the valves leak. Thus, the prior valves need cleaning frequently to maintain them in leakproof condition, or frequent replacement. Effective cleaning is a major operation, requiring among other operations draining of the hot water tank and disconnection and reconnection of lines, apart from the actual removal of scale. It has been found that by forming the valve with a sleeve of resilient material a portion of which acts as a valve seat as above described, the movable valve member and valve seat are self-cleaning during operation of the valve and the valves remain in service without leaking for much longer periods of time without needing additional cleaning operations by service personnel or replacement.

While the direction of fluid flow through the valve has been shown and described above as being into the valve body through the port 5 and out through the port 7, it is contemplated that the direction of fluid flow could be reversed with the port 7 thus constituting an inlet port and the port 5 constituting an outlet port.

Figure 3:
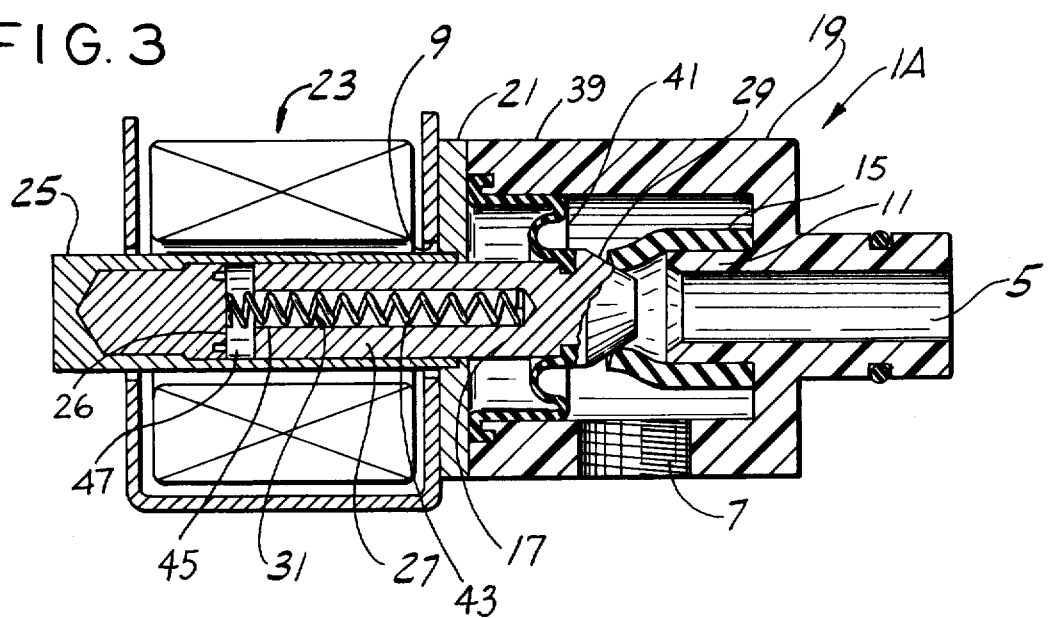
FIG. 3 is a view similar to FIG. 1 showing a second embodiment of the valve.

A second embodiment 1A of the valve of this invention is shown in FIG. 3. It is similar to the valve 1 except that it further comprises a valve body 39 of the "dry-type" having a diaphragm 41 secured to the plunger rod 27 adjacent the valve member 29, and that the means 31 for biasing the valve plunger into engagement with the sleeve comprises a compression spring 43 in a recess 45 in the outer end of the plunger rod, one end of the spring engaging the plunger rod at the inner end of the recess and the other end engaging the closed end 26 of the plunger guide 25. The diaphragm 41 blocks fluid communication between the valve chamber 3 and the plunger guide 25 and thus prevents the accumulation of scale on the plunger rod 27 and the plunger guide 25. Such accumulations of scale would hinder the sliding movement of the plunger rod in the guide. Moreover, if the plunger rod 27 were surrounded by fluid such as water which is incompressible, the movement of the rod would be slowed by the water in that any change in the volume of the space 47 between the closed end 26 of the plunger guide 25 and the outer end of the plunger rod 27 must be accompanied by the flow of fluid of a corresponding volume through the clearance space between the plunger rod and the plunger guide. In effect, the plunger rod and plunger guide assembly would operate in some respects like a dash pot. With air, which is a compressible fluid, in the plunger guide 25, the resistance to movement of the plunger rod is significantly lower than if incompressible fluid is in the plunger guide.

Figure 4:
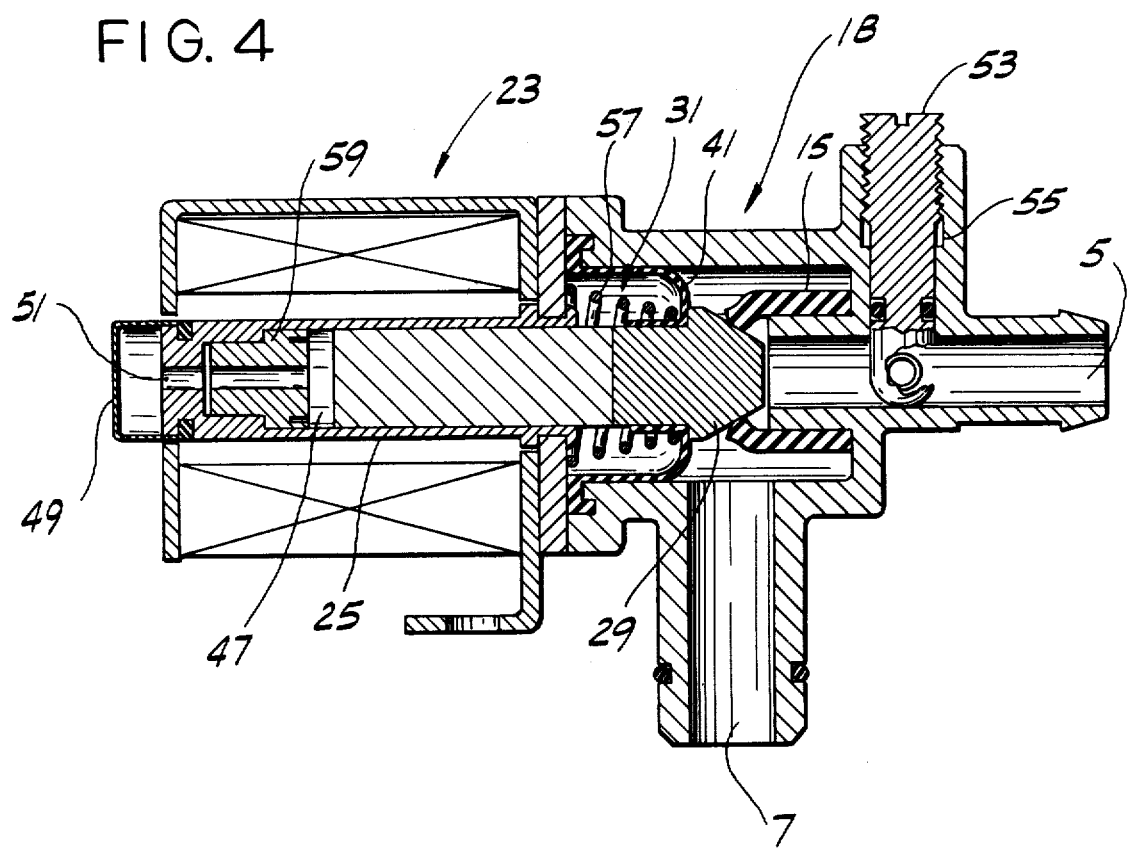
FIG. 4 is a view similar to FIG. 1 showing a third embodiment of the valve.

A third embodiment 1B of the valve of this invention is shown in FIG. 4. It is similar to the valve 1A further comprising expansible chamber means 49 closing the end of the cylinder or plunger guide 25, a passage 51 in the cylinder or plunger guide 25 for fluid communication between the expansible chamber means and the space 47 in the cylinder or plunger guide, and a metering screw 53 threaded in a bore 55 in the valve body for controlling the rate of flow of fluid through the valve. Also, in the valve 1B the biasing means 31 comprises a coil spring 57 carried on the plunger rod. The expansible chamber means 49 comprises an end cap of suitable elastically deformable material such as silicone rubber secured in sealing relation to the cylinder or plunger guide 25 at the outer end thereof, the end cap expanding upon movement of the plunger rod 27 toward the outer end of the plunger guide and the resultant compression of the air in the space 47, and contracting upon movement of the plunger rod away from the outer end of the plunger guide, thereby facilitating movement of the plunger rod. A stop such as a ported insert 59 is provided in the plunger guide 25 adjacent its outer end engageable by the outer end of the plunger rod 27 for limiting movement of the plunger rod toward the outer end of the plunger guide. The end cap, which is preferably transparent, holds fluid from the valve chamber 3 which may have leaked past the diaphragm 41 and into the plunger guide 25, thus providing a visually detectable indication that the diaphragm 41 is defective and that the valve 1B should be repaired or replaced.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A valve comprising:
    a body having a chamber therein, a fluid inlet port and a fluid outlet port in communication with the chamber, an opening for a valve plunger, and a nipple extending into the chamber, the nipple having a passage therethrough constituting one of said ports;
    a valve plunger extending through the opening in the body movable toward and away from an end of the nipple, said plunger having a generally conical valve member at its end toward the nipple in axial alignment with the passage in the nipple; and
    a sleeve of resilient material secured to the nipple in stretched surrounding relation with respect to the nipple, the sleeve being of generally circular section and having a portion extending beyond the end of the nipple, the inner surface of the extending portion of the sleeve at the free end thereof being countersunk, thereby forming a frustoconical valve seat;
    said valve member being engageable with said frustoconical seat for blocking fluid flow through said one port;
    the angle of said frustoconical seat relative to the axis of the sleeve being at least as great as the angle of said conical valve member relative to the axis of the sleeve, whereby the valve member, on entry into the sleeve, engages the inner end of said frustoconical seat and on continued movement in the direction toward the nipple, expands the extending portion of the sleeve and sealingly engages the frustoconical seat, said valve member, in moving into the sleeve, wiping the frustoconical seat to remove scale which may have deposited on the seat and on the portion of the valve member engageable with the seat.

2. A valve as set forth in claim 1 wherein the passage through the nipple constitutes the inlet port.

3. A valve as set forth in claim 1 wherein said sleeve is a tube of silicone rubber.

4. A valve as set forth in claim 1 wherein the angle of said frustoconical seat relative to the axis of the sleeve is in the range of approximately 30° to 45°.

5. A valve as set forth in claim 1 further comprising a solenoid on the body at the opening therein having a tubular plunger guide in line with the opening, the plunger having a sliding fit in the plunger guide, a diaphragm secured to the plunger for blocking fluid communication between the chamber and the plunger guide, and expansible chamber means closing the outer end of the plunger guide adapted to expand upon movement of the plunger toward the outer end of the plunger guide and to contract upon movement of the plunger away from the outer end of the plunger guide, said means further being adapted to hold fluid from the valve chamber which may have leaked past the diaphragm and into the plunger guide.

6. A valve as set forth in claim 1 wherein the solenoid further comprises a stop in the plunger guide adjacent its outer end engageable by the outer end of the plunger for limiting movement of the plunger toward the outer end of the plunger guide, the stop having a passage therein for flow of leakage fluid from the valve chamber to the expansible chamber means.

7. A valve as set forth in claim 5 wherein the expansible chamber means comprises an end cap of elastically deformable material secured to the plunger guide adjacent its outer end.

8. A valve as set forth in claim 7 wherein the end cap is transparent at least in part to enable visual detection of leakage fluid from the chamber.

9. A valve as set forth in claim 7 wherein the end cap is of silicone rubber.

10. A valve comprising:
    a body having a chamber therein, a fluid inlet port and a fluid outlet port in communication with the chamber, and an opening for a valve plunger;

a valve plunger extending through the opening in the body movable between a closed position for blocking fluid flow through the body and an open position for allowing fluid flow;

a solenoid on the body at the opening therein having a tubular plunger guide in line with the opening, the plunger having a sliding fit in the plunger guide;

a diaphragm secured to the plunger for blocking fluid communication between the chamber and the plunger guide; and expansible chamber means in sealed relation to the outer end of the plunger guide closing the outer end of the plunger guide against escape of fluid from the outer end of the plunger guide, said expansible chamber means being expansible in response to pressure developed therein upon movement of the plunger toward the outer end of the plunger guide and contractible in response to reduction in pressure therein upon movement of the plunger away from the outer end of the plunger guide, said means further being adapted to hold fluid from the valve chamber which may have leaked past the diaphragm and into the plunger guide.

11. A valve as set forth in claim 10 wherein the solenoid further comprises a stop in the plunger guide adjacent its outer end engageable by the outer end of the plunger for limiting movement of the plunger toward the outer end of the plunger guide, the stop having a passage therein for flow of leakage fluid from the valve chamber to the expansible chamber means.

12. A valve as set forth in claim 10 wherein the expansible chamber means comprises an end cap of elastically deformable material secured to the plunger guide adjacent its outer end.

13. A valve as set forth in claim 12 wherein the end cap is transparent at least in part to enable visual detection of leakage fluid from the chamber.

14. A valve as set forth in claim 12 wherein the end cap is of silicone rubber.

15. A valve comprising:
a body having a chamber therein, a fluid inlet port and a fluid outlet port in communication with the chamber, an opening for a valve plunger, and a nipple extending into the chamber, the nipple having a passage therethrough constituting one of said ports;

a valve plunger extending through the opening in the body movable toward and away from an end of the nipple, said plunger having a valve member at its end toward the nipple in axial alignment with the passage in the nipple; and a sleeve of resilient material secured to the nipple in stretched surrounding relation with respect to the nipple, the sleeve being of generally circular section and having a portion extending beyond the end of the nipple, the inner surface of the extending portion of the sleeve at the free end thereof being countersunk, thereby forming a frustoconical valve seat;

said valve member having a sloping surface portion engageable with said frustoconical seat for blocking fluid flow through said one port;

the angle of said frustoconical seat relative to the axis of the sleeve being at least as great as the angle of said sloping surface portion of said valve member relative to the axis of the sleeve, whereby said sloping surface portion of the valve member, on entry into the sleeve, engages said frustoconical seat inwardly from the outer end of the sleeve and on continued movement in the direction toward the nipple, expands the extending portion of the sleeve and sealingly engages the frustoconical seat, said valve member, in moving into the sleeve, wiping the frustoconical seat to remove scale which may have deposited on the seat and on the said sloping surface portion of the valve member engageable with the seat.

16. A valve as set forth in claim 15, further comprising:
a solenoid on the body at the opening therein having a tubular plunger guide in line with the opening, the plunger having a sliding fit in the plunger guide;

a diaphragm secured to the plunger for blocking fluid communication between the chamber and the plunger guide; and expansible chamber means in sealed relation to the outer end of the plunger guide closing the outer end of the plunger guide against escape of fluid from the outer end of the plunger guide, said expansible chamber means being expansible in response to pressure developed therein upon movement of the plunger toward the outer end of the plunger guide and contractible in response to reduction in pressure therein upon movement of the plunger away from the outer end of the plunger guide, said means further being adapted to hold fluid from the valve chamber which may have leaked past the diaphragm and into the plunger guide.

17. A valve as set forth in claim 16 wherein a stop is provided in the plunger guide adjacent its outer end engageable by the outer end of the plunger for limiting movement of the plunger toward the outer end of the plunger guide, the stop having a passage therein for flow of leakage fluid from the valve chamber to the expansible chamber means, said expansible chamber means comprising an end cap of elastically deformable material secured to the plunger guide at its outer end.

18. A valve as set forth in claim 17 wherein the end cap is transparent at least in part to enable visual detection of leakage fluid from the chamber.

* * * * *